May 11, 1965 C. U. DEATON 3,182,637
HOLDER FOR PENS AND THE LIKE
Filed May 11, 1962 5 Sheets-Sheet 1

INVENTOR.
CHARLES U. DEATON
BY
ATTORNEYS

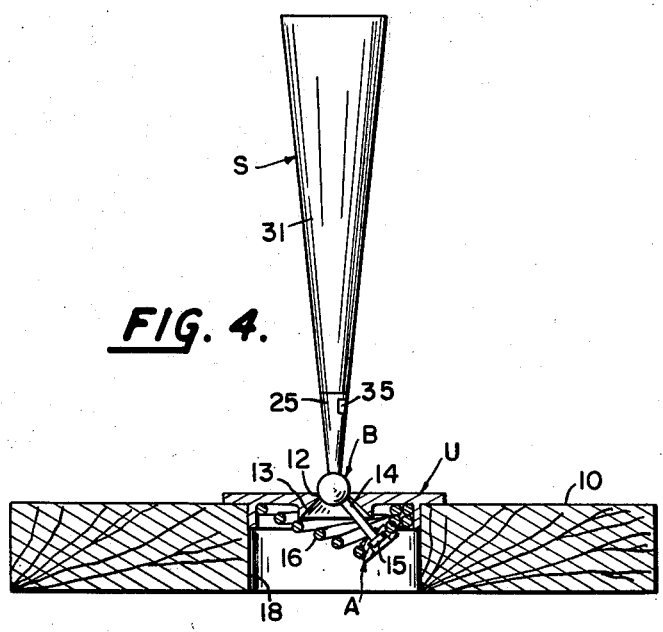
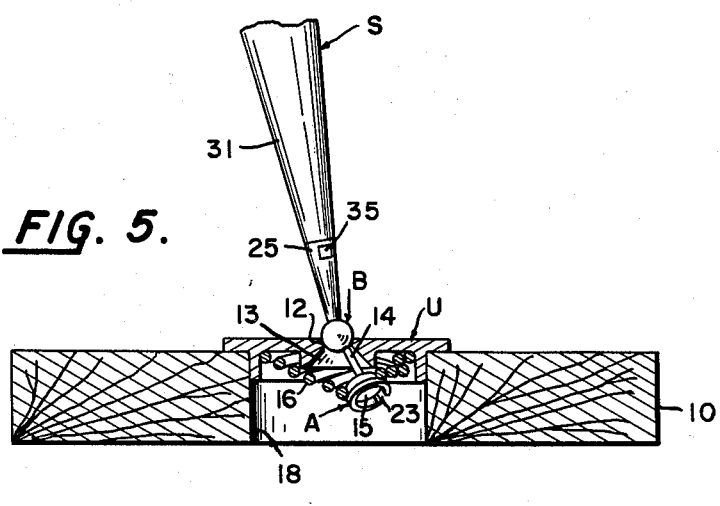

May 11, 1965  C. U. DEATON  3,182,637
HOLDER FOR PENS AND THE LIKE
Filed May 11, 1962  5 Sheets-Sheet 3
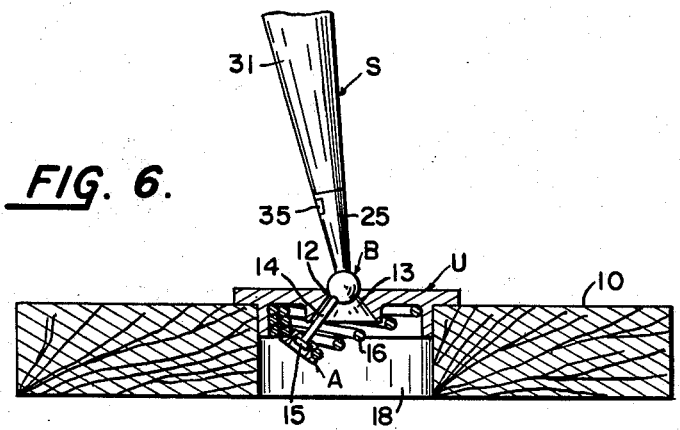
FIG. 6.
FIG. 7.
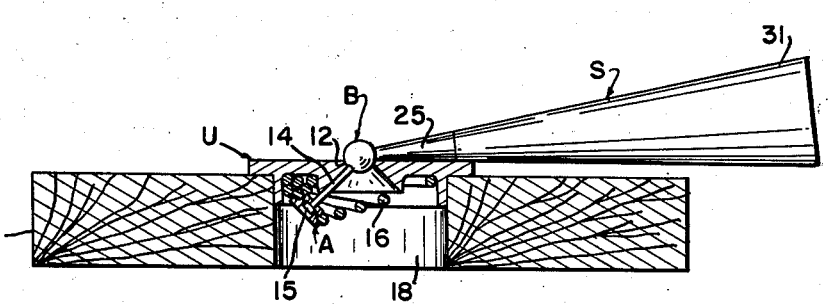
FIG. 8.
INVENTOR.
CHARLES U. DEATON
BY
Horace B. Van Valkenburgh
Gary D. Fields
ATTORNEYS May 11, 1965    C. U. DEATON    3,182,637
HOLDER FOR PENS AND THE LIKE
Filed May 11, 1962    5 Sheets-Sheet 4
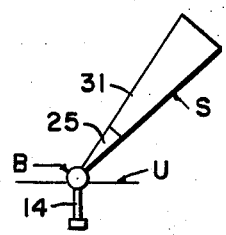
FIG. 9.
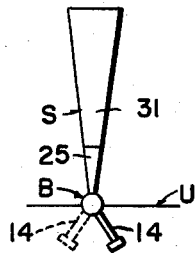
FIG. 10.
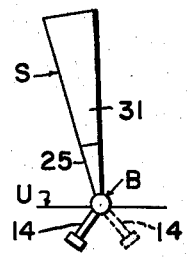
FIG. 11.
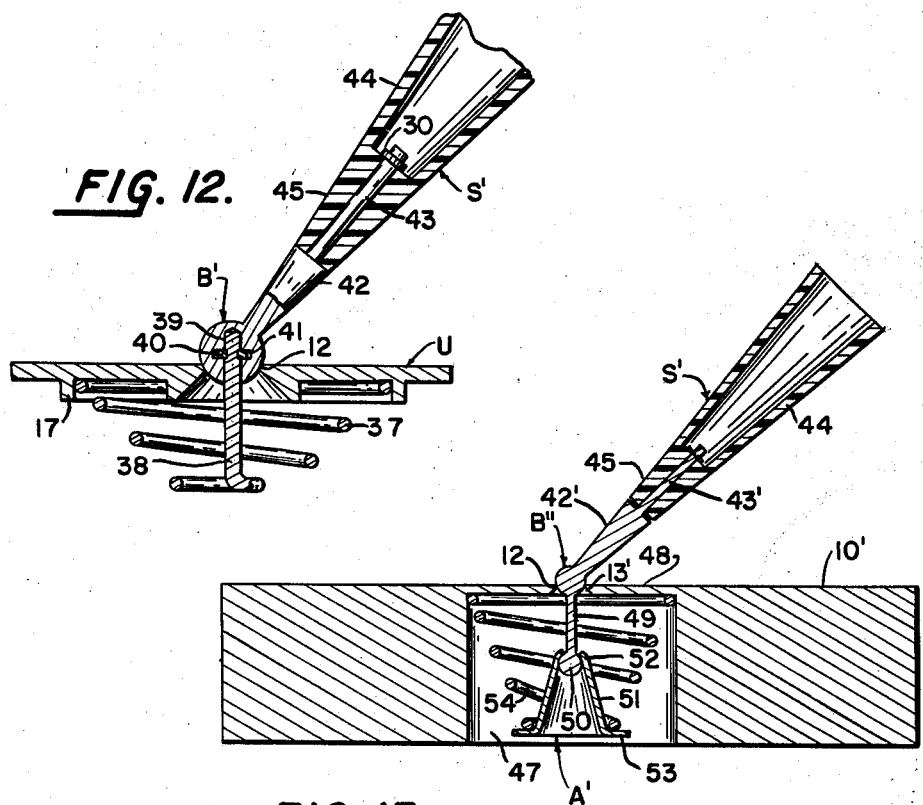
FIG. 12.
FIG. 13.
INVENTOR.
CHARLES U. DEATON
BY Horace B Van Valkenburgh
Gary D. Fields
ATTORNEYS

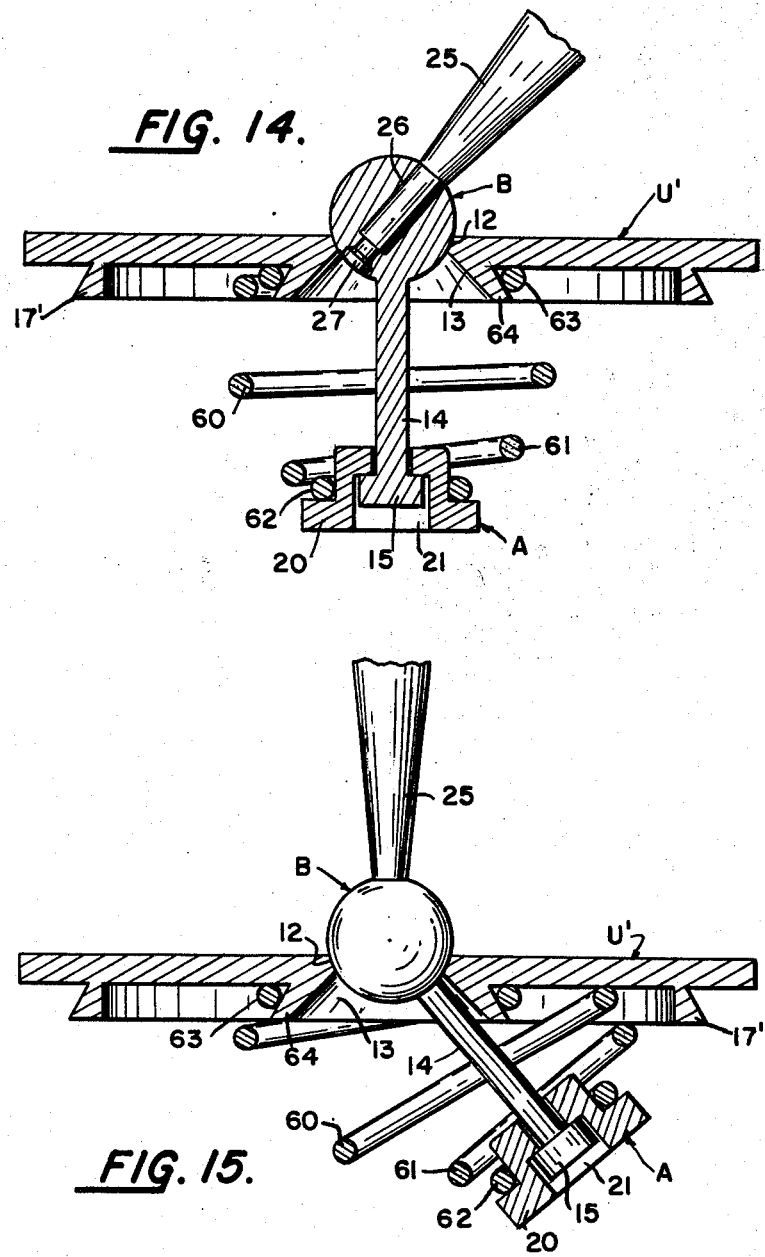

United States Patent Office 3,182,637
Patented May 11, 1965

3,182,637
HOLDER FOR PENS AND THE LIKE
Charles U. Deaton, Jefferson County, Colo.
(Genesee Mountain Rte. 3, Golden, Colo.)
Filed May 11, 1962, Ser. No. 194,012
16 Claims. (Cl. 120—108)

This invention relates to holders for pens and the like.

Previous pen holders, which are usually utilized as accessories on a desk or the like, have been of various types. In one type, a socket for the pen is attached to a pivot mounted for movement about a horizontal axis, permitting movement of the pen from a generally horizontal to a generally vertical position, but in a vertical plane only. The pivot is mounted in a head having a stem, which projects through a base. While the head and its stem are mounted for rotation about a vertical axis through 360°, the pen and socket must be moved to an approximately horizontal position to turn the stem, without danger of breaking off the extending end of the pen socket. Also, a spring is used to cause the pen to be retained in the position in which placed, but adjustment of this spring is difficult and the last position in which the socket is placed may not be the most convenient position for securing the pen the next time its use is desired. In another type, a magnet is mounted in a base and attracts a relatively large ball which is mounted on the lower end of the pen socket, so as to retain the ball in any position in which placed. However, the pen holder is not returned to a convenient position for obtaining the pen, the next time the use thereof is desired. In still another type, a head which is rotatable through a full circle is provided with a slot, in which the lower end of the pen socket is movable, but in a vertical plane only, with a ratchet for holding the pen socket in one of an upright, approximately 45° and flat position, in either direction. The pen holder will stay in any position in which placed, but again the last position is not always the most convenient for obtaining the pen when the next use is desired.

Among the objects of this invention are to provide a novel holder for pens and the like; to provide such a holder which includes a socket for a pen or the like; to provide such a holder in which the socket is always returned to a desired angular position, such as 35° to 45° to the vertical, for readier access at the time of next use; to provide such a holder in which the socket may be moved to any desired position, both around a full circle and also between horizontal and vertical; to provide such a holder which may be moved to such positions without the danger of overstressing or breaking the parts; to provide such a holder which may exist in more than one embodiment; to provide each such embodiment which is efficient and effective in operation; and to provide each such embodiment which may be readily manufactured and assembled.

Additional objects and the novel features of this invention will become apparent from the description which follows and the accompanying drawings, in which:

FIG. 4 is a vertical section, on a slightly reduced scale, showing the socket of the pen holder of FIG. 2 moved to an upright or vertical position;

FIG. 5 is a vertical section, similar to FIG. 4, but showing the socket moved slightly past the upright position, with certain parts shown at the beginning of movement;

FIG. 6 is a vertical section similar to FIG. 4, but with the pen socket in the position of FIG. 5 and certain parts shown as having completed their movement;

FIG. 7 is a vertical section similar to FIG. 4, but showing the pen socket moved to a position opposite that shown in FIG. 2;

FIG. 8 is a vertical section, similar to FIG. 4 but showing the pen socket moved downwardly from the position of FIG. 2 to a generally horizontal position;

FIG. 9 is a diagram, on a reduced scale, showing the pen socket and certain associated parts in the position of FIG. 2;

FIG. 10 is a diagram similar to FIG. 9, but illustrating the permissible movement of certain parts with the pen socket in upright position;

FIG. 11 is a diagram similar to FIG. 9, but illustrating the movement of certain parts when the socket is moved off center, or past an upright position, such as to the position of FIGS. 5 and 6;

FIG. 12 is a vertical section of a pen holder constructed in accordance with this invention and illustrating an additional embodiment;

FIG. 13 is a vertical section of a base and a pen holder constructed in accordance with this invention, illustrating a further embodiment;

FIG. 14 is a further enlarged, fragmentary vertical section, illustrating an alternative spring construction, with the pen socket in the position of FIG. 2; and FIG. 15 is a vertical section similar to FIG. 14, but illustrating the position of the spring coils or convolutions when the pen socket is moved to an upright or vertical position.

Figure 1:
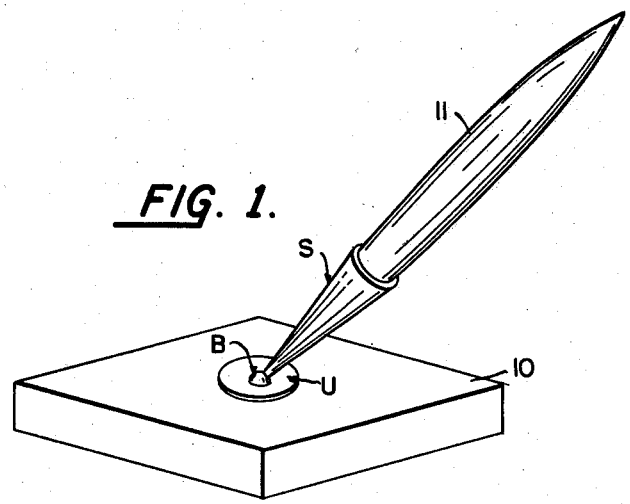
FIG. 1 is a perspective view of a base and a pen holder constructed in accordance with this invention, the holder including a socket and a pen being shown in the socket.

A pen holder constructed in accordance with this invention may, as in FIG. 1, include generally a support U mounted on a base 10, with a ball B mounted for rotation through a full circle and also pivotal movement through approximately 180°. A pen socket S is rotatably mounted on ball B and is adapted to receive a conventional pen 11, such as a fountain pen of the desk type, although it may receive a mechanical pencil, other type of writing instrument, or any other desired type of device. The normal angular position of socket S is conveniently that shown, but the socket may be moved from an approximately horizontal position, against base 10 on one side, to an approximately upright position. When socket S is moved slightly past the upright position, the ball B and certain associated parts will rotate through 180°, as will hereinafter appear, whereupon the socket S may be moved downwardly to an approximately horizontal position on the opposite side. Of course, the socket S also may be moved in a full circle while in any angular position below the upright position.

Figure 3:
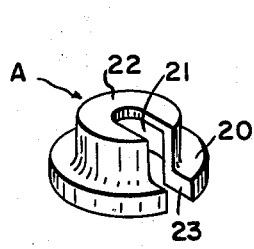
FIG. 3 is an enlarged perspective view of an abutment or cup, forming a part of the pen holder of FIGS. 1 and 2.
Figure 2:
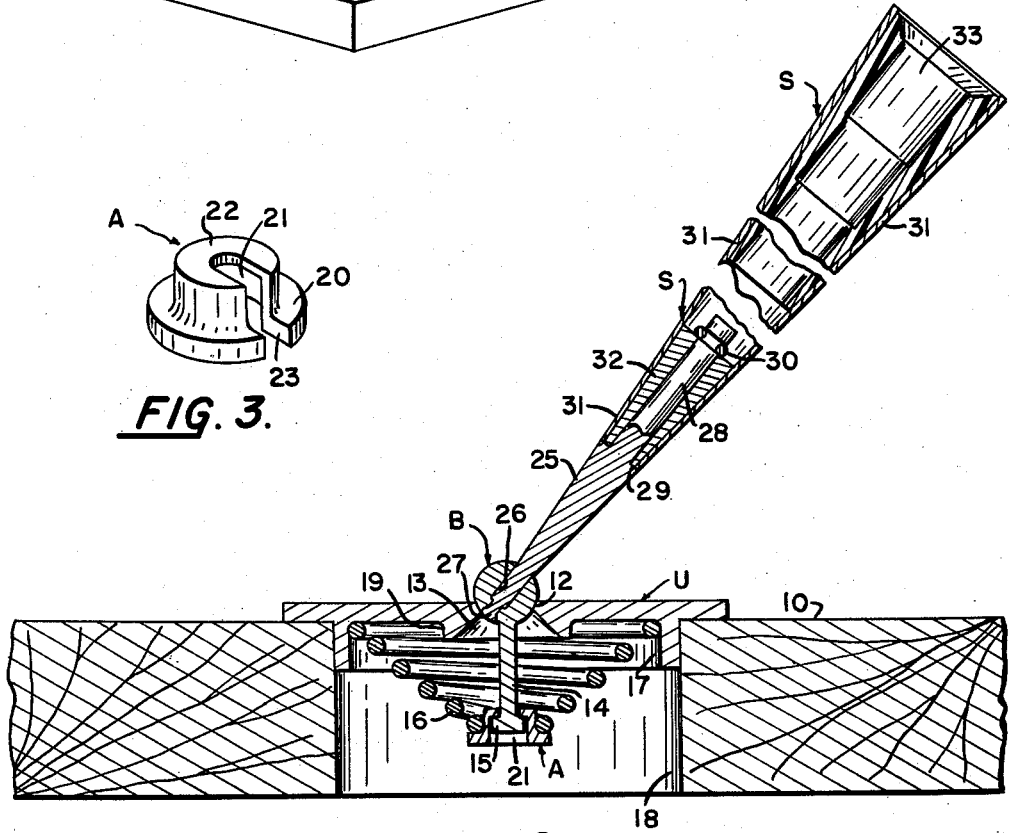
FIG. 2 is an enlarged, fragmentary, condensed vertical section of a portion of the base and the pen holder of FIG. 1, the pen socket being shown in a normal position, uninfluenced by an exterior force.

As in FIG. 2, the support U is provided with a central aperture having an upper portion 12, preferably provided with a spherical surface to receive the spherical ball B, and an outwardly and downwardly flaring lower portion 13, which accommodates movement of a stem 14, which may be integral with ball B, as shown, and normally extends downwardly in vertical position through the aperture in support U. The lower end of stem 14 is conveniently provided with a cylindrical head 15, on which is rotatably mounted an abutment or cup A, against which the lower coil or convolution of a spring 16 bears. The upper coil or convolution of spring 16 bears against the underside of support U, which is provided with an outer depending flange 17, the outer surface of which is adapted to fit within a hole 18 in base 10 and the inner surface of which is adapted to restrain outward movement of the upper coil of spring 16. Support U may also be provided with an inner flange 19, through which the downwardly and outwardly flaring lower portion 13 of the aperture in the support extends. As in FIG. 3, abutment A is conveniently generally cylindrical, being provided with a lower, outwardly extending flange 20 engaged by the lower coil of spring 16, such engagement causing abutment A to remain stationary with the spring, with respect to rotation relative to stem 14. The abutment is also provided with a well 21, extending upwardly from the bottom, in which head 15 of stem 14 is received, and a top 22, the underside of which engages the upper surface of head 15 but rotates on head 15. Abutment A is also provided with a slot 23, which extends partially therethrough from one side and has a width corresponding to the diameter of stem 14, so that abutment A may be slipped onto the stem and over head 15.

The ball B, as in FIG. 2, is further provided with a pin 25, the lower end of which extends through a hole 26 in ball B, the opposite end of the hole being reduced in section and then enlarged, so that the extreme end 27 of pin 25 may be riveted over into the enlargement, to secure pin 25 to the ball. At its upper end, pin 25 is provided with a spindle 28, about which pen socket S is rotatable, and a shoulder 29, to which the pen socket extends. Adjacent its upper end, spindle 28 may be provided with a circumferential groove into which a resilient ring 30 may be snapped, to maintain the pen socket S in position. Socket S may be constructed in any suitable manner, such as including a hollow outer sleeve 31, conveniently conical in shape and at the inner end of which is a tapered, frusto-conical block or plug 32. A liner 33 is conveniently received within outer shell 31, the liner being provided with a series of cylindrical steps of decreasing diameter, so as to receive a pen or the like, although other forms of liners or inner sleeves may be utilized, such as formed by resilient or spring like members. Thus, liner 33 may be formed of plastic, while block 32 may be formed of either metal or plastic and outer sleeve 31 is conveniently formed of metal. However, the outer sleeve, liner and block may be integral and formed of plastic or other suitable material. Also, pin 25 and particularly spindle 28 are conveniently formed of metal. Ball B and its stem 14 are, of course, more conveniently formed of metal, while support U may be formed of metal, such as a die casting. For esthetic reasons, base 10 may be formed of wood, such as hardwood, although other materials may be utilized.

In accordance with this invention, the stem 25 extends upwardly from ball B at an appropriate angle to the axis of stem 14, so that the axis of pen socket S will be disposed at a convenient angle for the user to remove the pen from the socket. Such an angle is conveniently approximately 35° to 45° from the vertical, such as 38½°, in which event the angle between the axis of stem 14 and pin 25 will be 141½°, although other angles may be utilized. As will be evident, spring 16 tends to return abutment A, together with the lower end of stem 14, to a position opposite the center of the aperture in support U, so that in the absence of an outside force, the socket S will assume the angular position shown in FIG. 2, irrespective of its position around the base. However, if the pen is on the opposite side of the base from the user, the user may merely pull the pen toward him. Of course, the socket S can be rotated through a full circle, with the stem 14 remaining in the downwardly extending position, although it is normally more convenient, if the pen is to be moved to the opposite side of the base, for the user merely to pull the pen and socket toward him. When this occurs, the pen and socket will first be moved to an upright position, as shown in FIG. 4, in which the stem 14 is pivoted upwardly, the coils of the spring being pushed closer together on one side and pulled farther apart on the other. It will be noted that an indicating mark 35 is shown on the pin 25 in FIGS. 4–7, for the purpose of showing the relative position of the pin. When the pen and socket S, or socket alone, are moved in a vertical plane, the socket will move through the upright position of FIG. 4 and to a position on the opposite side thereof. However, as soon as socket S has moved a sufficient distance past the upright position, such as through an angle of 3½° from the upright position, the force of the compressed side of spring 16 will cause the stem 14 and ball B, with pin 25 along with it, to rotate around through 180°. The stem and ball are free to rotate in this manner, through rotation of spindle 28 of the stem in socket S. The position of FIG. 5 is a momentary position during such movement, being shown to illustrate the manner of movement of the parts. Thus, the spring will rotate stem 14 to the position of FIG. 6, it being noted that the indicating mark 35 shows that the pin 25 has moved through 180°. Thus, one half of indicating mark 35 appears in FIG. 4, while the opposite half of the indicating mark 35 appears in FIG. 6. This movement takes place relatively rapidly, so that the stress which would be otherwise imposed on the pin 25, particularly adjacent ball B, is reduced to a negligible amount and therefore there is no chance of overstressing the pin 25. Of course, the pen and socket may be moved further toward the opposite side of the base, such as to the position of FIG. 7. Also, if the pen and socket, or socket alone, are released when in the position of FIG. 6, the parts will automatically assume the position of FIG. 7, due to the fact that spring 16 always exerts a downward pressure on the lower end of stem 14.

The pen and socket, or socket alone, may also be pushed downwardly to a generally horizontal position, such as shown in FIG. 8, to which the pen socket S has been moved from the position of FIG. 2. However, the pin and socket, or socket alone, may be moved downwardly from the position of FIG. 7 to a position diametrically opposite that shown in FIG. 8, as will be evident. Such a position is also desirable for shipping purposes, since the pen holder and base can be packaged in a smaller carton or the like, with the socket in a flat position, i.e. against the base. Furthermore, with the pen and socket, or socket, alone, in either the down position of FIG. 8 or the upright position of FIG. 4, irrespective of the position thereof around the full circle, the spring 16 will immediately cause the pen socket to be moved to the position of FIG. 2, or a position corresponding to the same, when the outside force on the pen and socket, or socket alone, is released. Thus, the pen is always presented to the user in a position accessible for use, or may be readily moved to such a position. A position readily accessible for use, as used herein, is understood to mean a position in which the pen may be readily lifted from its socket for use in the usual manner.

Diagrams illustrating certain possible movements of the pen socket and stem are shown in FIGS. 9, 10 and 11. Thus, the position of FIG. 9 is the normal position, uninfluenced by an outside force. In FIG. 10, it is indicated that the stem 14 is rotatable to any position around a full circle, i.e. between the full and diametrically opposite dotted positions and any position intermediate to same, with the pen socket S in an upright position. Also, FIG. 11 illustrates the movement of the stem 14, from the dotted position initially assumed when the pen socket S is tilted past the upright position, to the position shown in full lines, to which the stem is moved by the spring. Of course, the full line position of FIG. 11 corresponds to the position of FIG. 6, while the stem 14, in movement between the dotted and full line positions of FIG. 11, will pass through the position shown in FIG. 5.

In the additional embodiment of FIG. 12, the same support U may be utilized, but spring 37, the upper coil of which engages the underside of support U within outer flange 17, is provided with a stem 38 which is integral with the lower coil and extends centrally thereof and upwardly into a hole 39 in ball B'. Stem 38 is rotatable in hole 39 and is conveniently secured by a snap fastener 40 which is inserted within the hole and into a cylindrical recess 41. When stem 38 is inserted in the hole, it expands fastener 40 into recess 41 until a circumferential groove in the stem is reached, into which the fastener snaps. Thus, longitudinal movement of stem 38 relative to ball B' is prevented. Ball B' is conveniently provided with an integral stem 42 having an upwardly extending spindle 43, about which a pen socket S' is rotatable. Outer sleeve 44 and lower block 45 of socket S' may be integral, with the pen socket being retained in position in any suitable manner, as by a snap ring 30, as before. The outer sleeve 44 and block 45 of pen socket S' may be formed of plastic, although any other material may be utilized. Also, an inner liner for receiving the end of the pen or the like, similar to the inner liner 33 of socket S of FIG. 2, may be provided within outer sleeve 44, or any other suitable device for receiving the pen.

The additional embodiment of FIG. 12 operates similarly to the embodiment previously described, it being noted that although stem 38 is integral with spring 37, relative rotation between ball B' and the spring is permitted. The axis of stem 38 and the axis of spindle 43 may be disposed at any suitable angle, such as that described previously, in order to position the pen socket S' normally at an angle of approximately 35° to 45° to the vertical.

In the further embodiment illustrated in FIG. 13, the support for the pen holder is made integral with the base 10', as though a well 47 extending upwardly from the lower surface thereof. A top 48 for well 47 is provided with a central aperture having an upper portion 12 provided with a cylindrical surface adapted to engage a ball B" and permit rotation as well as pivotal movement of the ball. An outwardly and downwardly flaring lower portion 13' of the aperture in top 48 accommodates the desired motion of a stem 49, which depends from the ball B" and is conveniently integral therewith. At its lower end, stem 49 is provided with a generally spherical head 50 which is received in the upper end of an abutment A', conveniently formed by spinning and having a conical side wall 51, the upper edge 52 of which is turned inwardly along an arc, so as to form a socket for the head 50. At its lower end, abutment A' is provided with an outwardly extending, lateral flange 53, engaged by the lower coil of a spring 54, the upper coil of which engages the under surface of well top 48, around the outer edge of well 47. Ball B" is also conveniently provided with an integral stem 42', provided with a spindle 43', on which a pen socket S' is rotatable. Pen socket S' may be constructed similarly to socket S' of FIG. 12, or a socket similar to socket S of FIG. 2 may be utilized.

As will be evident, spring 54 will tend to maintain abutment A' in a central position, with its axis aligned with the aperture through which stem 49 extends, thereby also tending to maintain stem 49 in a vertical position. In turn, this will cause pen socket S' to be maintained at the corresponding angle which, as indicated previously, is conveniently between 35° and 45° to the vertical. As will also be evident, if pen socket S' of FIG. 13 is moved upwardly to an upright or vertical position, the stem 49 will be moved to the right, through an angle corresponding to the movement of the pen socket. This will cause abutment A' to pivot about head 50 of stem 49, to an angular position with respect thereto. However, if pen socket S' is moved slightly past the vertical position, the pressure of spring 54 will cause stem 49 and ball B", with pin 42' along with it, to be rotated around until stem 49 is directly beneath the lateral position of pin 42'. Also, if the pen holder is released in this position, the pressure of spring 54 will move the stem 49 downwardly and cause the holder to assume the desired angular position for convenient use.

Other forms of the spring may be utilized, such as that of spring 60 of FIGS. 14 and 15, which is provided with an upper intermediate coil of maximum diameter, a lower intermediate coil 61 of reduced diameter and a lower coil 62 of still further reduced diameter, which engages the abutment A. Also, spring 60 is provided with an upper coil 63, also of reduced diameter, which engages the outside of the outwardly and downwardly tapering outer surface of an inner flange 64 of a support U', the inner surface 13 of which also flares outwardly and downwardly, as the lower portion of an aperture having a spherical upper portion 12 to receive a ball B. As before, a stem 14 conveniently extends downwardly from the ball B and is provided at its lower end with a head 15, which rotatably engages abutment A, while lower flange 20 of abutment A is engaged by the lower coil 62 of spring 65. Ball B is conveniently provided with a pin 25 extending upwardly therefrom at a desirable angle to the axis of stem 14 and is provided with a spindle on which a pen socket is rotatably mounted. Support U', which may be mounted on a base similar to base 10 of FIGS. 1 and 2, is provided with an outer flange 17', the outer edge of which conveniently tapers outwardly and downwardly to provide a relatively tight fit with the inside of a hole in the base, such as similar to hole 18 of base 10 of FIG. 2.

As shown in FIG. 15, the larger intermediate coil of the spring 60 is adapted to move upwardly, at one side, to the underside of support U', with the same side of the smaller intermediate coil 61 just beneath, when the pen socket and pin 25 are moved to an upright position. Thus, interference or crowding of the coils of the spring on one side will be avoided, it being noted that the coils of the spring are spread apart on the opposite side. This also facilitates the action of the spring in moving the stem 14 through 180°, when the pen socket and stem 25 are moved slightly over center. It will be understood, of course, that any of the embodiments previously described may be provided with a spring constructed similarly to the spring 60 of FIGS. 14 and 15.

From the foregoing, it will be evident that a holder for pens and the like constructed in accordance with this invention fulfills to a marked degree the requirements and objects hereinbefore set forth. Thus, by providing a member, such as a ball, which is rotatable in an aperture in a support, with a pen socket rotatably mounted on a pin or other member extending upwardly from the ball and a stem extending downwardly from the ball, with a spring exerting pressure against the lower end of the stem, the pen socket may be moved around a full circle, in any position, and also may be moved downwardly to the support or upwardly to an upright position. Furthermore, when the pen socket is moved slightly past the upright position, the spring will automatically cause the stem to seek its lowest point, i.e. directly beneath the pen socket, thus causing the stem to rotate through 180° or a half circle when the pen socket is moved slightly past center. Furthermore, by a suitable angle between the axis of the stem and the axis of the pin, the pen socket may always be presented, when outside force is removed, at a desirable angle for use.

This angle appears to be somewhere between 35° and 45° to the vertical, so that the angle between the axis of the stem and the pen is desirably between 135° and 145°, conveniently 141½°. It will be understood, of course, that other angular relationships between the pen and the stem may be utilized, while the diameters of the various coils of the spring may be varied. Thus, the coils of the spring may be formed generally as a cone, although by utilizing intermediate coils of decreasing size and an upper coil of a smaller size than the intermediate coils, any tendency for the coils to bind or interfere with each other will tend to be obviated.

Although several different embodiments of this invention have been illustrated and described and certain variations therein also illustrated and described, it will be understood that other embodiments may exist and other variations may be made, all without departing from the spirit and scope of this invention. It will also be understood that other types of springs and other types of resilient means may be utilized.

What is claimed is:

1. A holder for pens and the like comprising a support having an aperture therein; a ball rotatable in the upper edge of said aperture and provided with a pin extending above said support, said pin being provided with means for receiving a pen and the like and said means being rotatable with respect to said pin; a stem depending from said ball and extending through said aperture, said stem being disposed angularly with respect to said pin; resilient means extending between the lower end of said stem and the underside of said support; and means for permitting relative rotation between said ball and said resilient means.

2. A holder for pens and the like comprising a support having an aperture therein; a ball rotatable in the upper portion of said aperture and provided with a pin extending above said support, said pin being provided with means for receiving a pen and the like and said means being rotatable with respect to said pin; a spring at one end engaging the underside of said support around said aperture and at the opposite end disposed at a position normally opposite but spaced from said aperture; and means extending between said spring at said opposite end and said ball in a direction disposed angularly to the direction of said pin, said means extending through said aperture and being constructed and arranged to permit relative rotation between said ball and said spring.

3. A holder as defined in claim 2, wherein said extending means comprises a stem depending from said ball and an abutment mounted on the lower end of said stem and rotatable thereon, said abutment being engaged by said opposite end of said spring.

4. A holder as defined in claim 2, wherein said extending means comprises a member attached to said opposite end of said spring and extending into said ball, said member being rotatably mounted in said ball.

5. A holder as defined in claim 4, wherein said member is integral with said spring.

6. A holder as defined in claim 2, wherein said spring is provided with coils decreasing in diameter from the upper to the lower end.

7. A holder as defined in claim 2, wherein said spring is provided with an intermediate coil of a larger diameter and upper and lower coils of a smaller diameter.

8. A holder as defined in claim 2, wherein said stem is disposed at an angle of approximately 135° to 145° with respect to said pin.

9. A holder for pens and the like comprising a support having an aperture therein; a ball rotatable in the upper portion of said aperture and provided with a pin extending above said support, said pin being provided with a socket for receiving a pen and the like; a stem depending from said ball and extending through said aperture, said stem being disposed angularly with respect to said pin; an abutment rotatably mounted on the lower end of said stem; and resilient means extending between and engaging said abutment and the underside of said support.

10. A holder as defined in claim 9, wherein said aperture is provided with an upper portion having a spherical surface for engaging said ball and a lower portion which flares outwardly and downwardly to accommodate movement of said stem.

11. A holder for pens and the like comprising a support having an aperture therein; a ball rotatable in the upper portion of said aperture and provided with a pin extending above said support, said pin being provided with a spindle; a socket for receiving a pen and the like and rotatable on said spindle; a coil spring having a coil at the upper end engaging the underside of said support and a coil at the lower end disposed at a position normally opposite but spaced from said aperture; a stem depending from said ball and extending through said aperture; and an abutment mounted on the lower end of said stem and rotatable thereon, said abutment being engaged by the lower coil of said spring.

12. A holder as defined in claim 11, wherein said spring is provided with an upper coil of a larger diameter and coils below said upper coil of decreasing diameter; and said support is provided with an outer depending flange, the inner side of which is engaged by the upper coil of said spring.

13. A holder as defined in claim 11, wherein said spring is provided with an upper intermediate coil of a larger diameter, an upper coil and a lower intermediate coil of a smaller diameter and a lower coil of a still smaller diameter; and said support is provided with a depending inner flange having downwardly and outwardly flaring inner and outer surfaces, said inner surface forming the lower portion of said aperture and the outer surface being engaged by the upper coil of said spring.

14. A holder as defined in claim 11, wherein the lower end of said stem is provided with an enlarged cylindrical head; and said abutment is provided with a well extending upwardly therein for receiving said head, a lower outwardly extending flange engaged by the lower coil of said spring, and a slot extending laterally into said abutment and having a width corresponding to the diameter of said stem above said head.

15. A holder for pens and the like, comprising a support having an aperture therein, said aperture having an upper portion providing with a spherical surface and a lower portion which flares downwardly and outwardly; a ball rotatable in the upper portion of said aperture and provided with a pin extending above said support, said pin being provided with a spindle; a socket for receiving a pen and the like and rotatable of said spindle; a coil spring having an upper coil of larger diameter engaging the underside of said support, said support having an outer depending flange the inside of which is engaged by said upper coil of said spring, said spring having coils below said upper coil of decreasing diameter, the lower coil of said spring extending to the center thereof and being provided with an integral, upwardly extending stem; said ball being provided with a hole extending centrally and upwardly therein and having an axis disposed at an angle of approximately 135° to 145° with respect to the axis of said spindle, said stem being disposed in said hole in said ball and being rotatable therein; and means for securing said stem against longitudinal movement in said hole in said ball.

16. A holder for pens and the like comprising a support having an aperture therein, said aperture having an upper portion provided with a spherical surface and a lower portion which flares downwardly and outwardly; a ball rotatable in the upper portion of said aperture and provided with a pin extending above said support, said pin being provided with a spindle; a socket for receiving a pen and the like and rotatable on said spindle; a stem depending from said ball and extending through said aperture, said stem having a generally spherical head at the lower end thereof; a cup having a conical side wall provided with arcuate upper edges for engaging said head of said stem, said cup having an outwardly extending flange at the lower end thereof; and a coil spring having an upper coil engaging the underside of said support and a lower coil engaging said flange of said cup.

References Cited by the Examiner
UNITED STATES PATENTS

| | | |
|---|---|---|
| 1,550,793 | 8/25 | Fairbank. |
| 1,876,197 | 9/32 | Bassett. |
| 2,519,675 | 8/60 | Lippincott. |
| 2,521,489 | 9/50 | Sorensen. |
| 2,793,259 | 5/57 | Parsons. |
| 3,027,807 | 4/62 | Barcus et al. |

FOREIGN PATENTS

| | | |
|---|---|---|
| 2,699 | 2/09 | Great Britain. |
| 1,150,461 | 8/57 | France. |

JEROME SCHNALL, *Primary Examiner.*

LAWRENCE CHARLES, *Examiner.*